Figure 1:
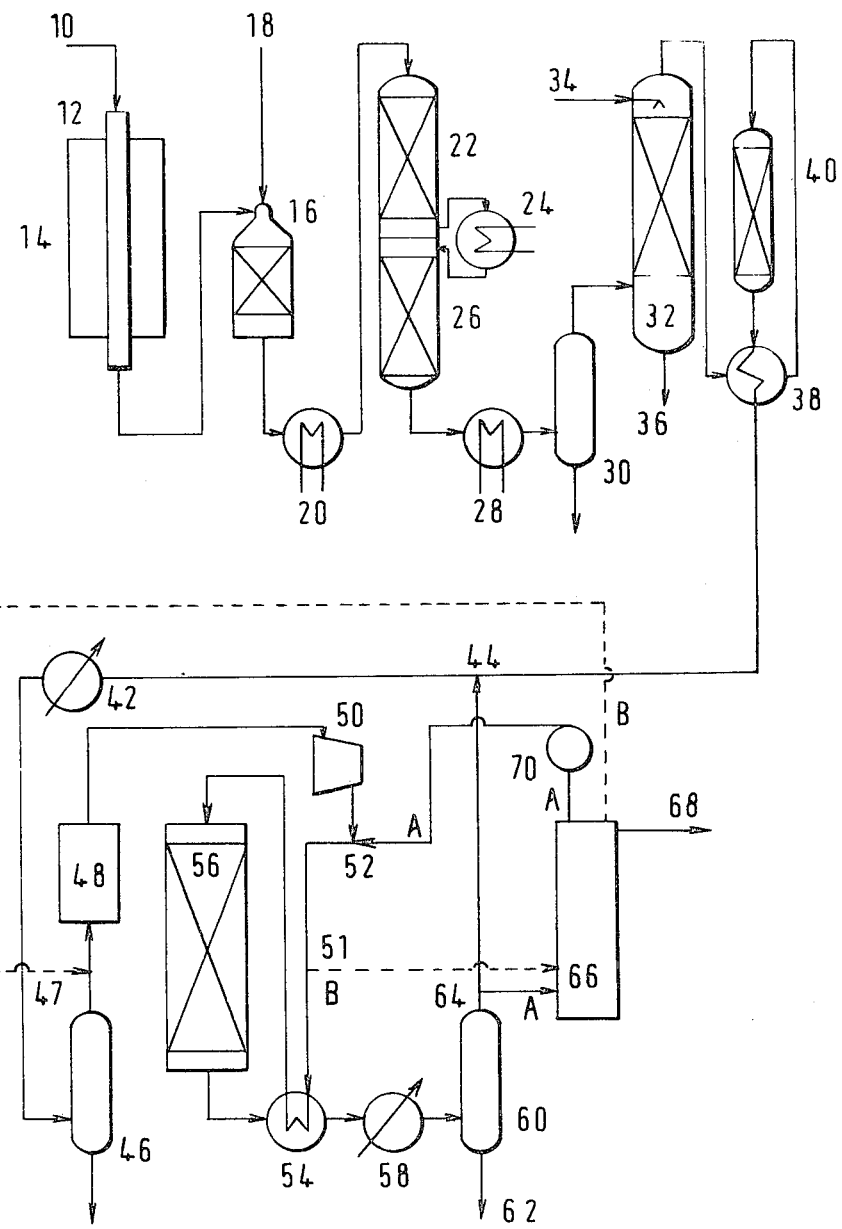

United States Patent [19]

Pinto

[11] 4,298,588
[45] Nov. 3, 1981

[54] AMMONIA PRODUCTION PROCESS

[75] Inventor: Alwyn Pinto, Stockton-on-Tees, England

[73] Assignee: Imperial Chemical Industries Limited, London, England

[21] Appl. No.: 105,297

[22] Filed: Dec. 19, 1979

Related U.S. Application Data

[63] Continuation of Ser. No. 934,259, Aug. 16, 1978, abandoned.

[30] Foreign Application Priority Data

Aug. 22, 1977 [GB] United Kingdom ............... 35096/77
Oct. 27, 1977 [GB] United Kingdom ............... 44766/77
Oct. 28, 1977 [GB] United Kingdom ............... 44996/77

[51] Int. Cl.$^3$ .............................................. C01C 1/04
[52] U.S. Cl. ...................................... 423/359; 55/23; 55/27; 423/362
[58] Field of Search ............... 423/359, 360, 361, 362, 423/363; 252/374, 375, 376, 377; 55/75, 23, 27

[56] References Cited

U.S. PATENT DOCUMENTS 3,839,229 10/1974 Senes et al. ......................... 423/362
3,947,551 3/1976 Parrish ................................. 423/359

FOREIGN PATENT DOCUMENTS 1057020 2/1967 United Kingdom ............... 423/359
1156002 6/1969 United Kingdom ............... 423/359
1186939 4/1970 United Kingdom ............... 423/359
2017071 9/1979 United Kingdom .

Primary Examiner—O. R. Vertiz
Assistant Examiner—Wayne A. Langel
Attorney, Agent, or Firm—Cushman, Darby & Cushman

[57] ABSTRACT

An ammonia production process comprises steam hydrocarbon primary reforming, air secondary reforming, carbon monoxide hift, carbon oxides removal, ammonia synthesis and discarding of non-reactive gases and is made more economical in energy consumption by using excess air in secondary reforming and treating the synthesis gas to separate a hydrogen-enriched stream and returning that stream to the synthesis. Preferably the synthesis gas after carbon moxides removal is compressed if at all by no more than 50% and consequently the process can be carried out in a plant having a gas circulator but no compressor. Preferably synthesis is at a pressure in the range 40–80 bar abs. and at an outlet temperature in the range 350°–430° C. over a catalyst containing iron, cobalt and promoting compounds. Recovery of the hydrogen-enriched stream is preferably from a side stream of synthesis gas.

12 Claims, 2 Drawing Figures

AMMONIA PRODUCTION PROCESS

This is a continuation of application Ser. No. 934,259 filed Aug. 16, 1978, now abandoned.

This invention relates to an ammonia production process in which the energy consumption can be smaller than in previously used processes and to a plant in which the process can be carried out.

The commonest ammonia production process comprises the following reactions in sequence:

| | | |
|---|---|---|
| 1. | Primary steam-hydrocarbon reforming | $CH_4 + H_2O \rightarrow CO + 3H_2$ |
| 2. | Secondary reforming | $CH_4 + O \rightarrow CO + 2H_2$ |
| 3. | Shift | $CO + H_2O \rightarrow CO_2 + H_2$ |
| 4. | Carbon oxides removal | |
| 5. | Ammonia synthesis | $N_2 + 3H_2 \rightarrow 2NH_3$ |

Reaction 1 proceeds incompletely in economic conditions of steam ratio, temperature and pressure but the small percentage of unreacted methane can be largely converted in reaction 2, which is carried out by feeding preheated air into the hot gas leaving reaction 1 and bringing the reaction mixture towards equilibrium over a catalyst. Usually the conditions in reaction 1 are chosen so that the quantity of air required in reaction 2 to provide oxygen also introduces the correct proporation of nitrogen required in reaction 5. It has, however, been proposed (UK specification Nos. 1156002, 1156003) to have substantially more methane in the gas leaving reaction 1, to use more air in reaction 2 and to remove the resulting excess of nitrogen cryogenically between reactions 4 and 5.

We have now realised that, especially when reaction 5 is to be carried out at a substantially lower pressure than that contemplated in 1156002 and 1156003, the removal of excess nitrogen can be with advantage carried out after ammonia synthesis instead of before it. A process of ammonia production with little or no compression of synthesis gas is proposed in UK specification No. 1186939, without consideration of many problems involved in an industrially practicable process.

According to the invention an ammonia production process comprises:
(a) primary catalytically reforming at superatmospheric pressure a hydrocarbon feedstock with steam to give a gas containing carbon oxides, hydrogen and methane;
(b) secondary catalytically reforming the gas from step (a) by introducing air and bringing the mixture towards equilibrium, whereby to produce a gas containing nitrogen, carbon oxides, hydrogen and a decreased quantity of methane;
(c) converting carbon monoxide catalytically with steam to carbon dioxide and hydrogen;
(d) removing carbon oxides to give a nitrogen-hydrogen ammonia synthesis gas;
(e) reacting the synthesis gas to produce ammonia and recovering ammonia from the reacted gas; and
(f) discarding non-reactive gases present in the synthesis gas;
and is characterised by
(i) operating step (a) in conditions of steam-to-carbon ratio, pressure and temperature to produce a gas containing at least 10% v/v of methane and using in step (b) a quantity of air in excess of what would introduce 1 molecule of nitrogen per 3 molecules of hydrogen; and
(ii) treating synthesis gas after reaction to synthesis ammonia to separate a stream enriched in hydrogen and and returning the enriched stream to the synthesis.

In this specification the term "step" will be used in referring to the major operations listed above and the term "stage" in referring to detailed operations within the steps.

The hydrocarbon feedstock is suitably methane or other steam reformable hydrocarbon such as a normally gaseous or liquid hydrocarbon boiling at up to about 220° C. The primary catalytic reforming can be in one stage, over a catalyst externally heated or, when the feedstock is of a higher molecular weight than methane and especially when it is normally liquid, can be in two stages, in the first of which the feedstock is catalytically converted with steam to a gas of high methane content at an outlet temperature under 650° C. and in the second of which that gas is reacted in the externally heated process. Various types of supported nickel catalyst are available for these hydrocarbon-steam reactions. The feedstock preferably should be substantially sulphur-free (under 0.5 ppm S) and may have been subjected to a preliminary catalytic hydrodesulphurisation and $H_2S$-removal treatment.

External heating can be effected by having the catalyst in tubes surrounded by a furnace or in adiabatic beds preceded by heating zones. Before entering the catalyst, when present in heated tubes, the hydrocarbon steam mixture is preheated, preferably to a temperature in the range 600°–700° C. which is higher than commonly used heretofore. When the hydrocarbon is methane or ethane it can be used directly at such a high preheat temperature. When it contains 3 or more carbon atoms in the molecule or includes unsaturated hydrocarbons, the preliminary conversion to gas of high methane content is useful in permitting the preferred high pre-heat temperature.

For a high level of fuel economy the pressure at the outlet of step (a) is preferably in the range 30–120, especially 40–80 bars abs. and the temperature is in the range 750°–850° C. The steam ratio is preferably in the range 2.5–3.5 molecules of total steam per atom of carbon in the hydrocarbon if all the steam and hydrocarbon are fed to this stage. The relatively high pressure gives rise to efficient heat transfer into the tubes and makes possible a saving of compression power further downstream. The relatively low steam ratio decreases the quantity of heat that has to be fed in and removed later. The temperature range is one for which thermally efficient steam reforming furnaces are available; at these temperatures the methane content of the product gas is tyically up to 30, for example in the range 10 to 20% by volume on a dry basis and this is preferred, although it is considerably higher than is normally thought suitable in the primary reformer gas of an ammonia synthesis plant.

The feed to step (b) includes the gas from step (a) (which may, if desired be further heated before entering step (b)) and an oxygen-containing gas, which is conveniently air and preferably is preheated to a temperature in the range 400°–700° C. Further steam can be fed to step (b) or further hydrocarbon feedstock if it is desired to minimise the total steam ratio without having too low a steam ratio in step (a), but usually all the hydrocarbon and steam are fed to step (a). In step (b) the outlet pressure is conveniently about the same as at the outlet of step (a), apart from the pressure drop through the secondary reforming catalyst. The outlet temperature is preferably in the range 950°–1050° C. and the outlet methane content in the range 0.2 to 10% v/v on a dry basis. Such a temperature is rather higher than has been proposed for processes using an over-stoichiometric air feed rate and has the effect of reacting a greater proportion of the hydrocarbon feedstock in the internally-heated secondary reformer and thus less in the thermally less efficient externally heated primary reformer, and also of permitting a lower steam ratio than the preferred high pressure would otherwise demand. The excess of air results in a gas containing 2.0 to 2.9 especially 2.2 to 2.7 molecules of hydrogen equivalent (i.e. total of $H_2$ and CO) per molecule of nitrogen. The catalyst in step (b) can be for example a supported nickel catalyst or chromium oxide catalyst or a combination thereof. Usually the reaction mixture is brought substantially to equilibrium.

By introducing the excess air into step (b) it becomes possible to operate step (a) to produce a gas of higher methane content, that is, at a lower temperature and/or lower steam ratio and/or higher pressure.

For step (c) the gas from step (b) is cooled with recovery of useful heat to the inlet temperature of the "shift" catalyst over which the reaction of carbon monoxide with steam occurs. Usually this temperature is in the range 300°–400° C., especially 320°–350° C., appropriate to iron-chrome shift catalysts. The reaction over the iron-chrome catalyst is exothermic (outlet temperature 400°–450° C.) and the outlet gas is again cooled with recovery of useful heat and subjected to further shift reaction, preferably over a copper-containing catalyst, for which the inlet temperature is suitably 200°–240° C. and the outlet temperature 240°–270° C. Such a low-temperature shift stage produces a gas containing usually 0.2 to 0.6% v/v of carbon monoxide on a dry basis. Since the pressure is higher than has been generally used in low temperature shift, the steam to dry gas molar ratio in the gas entering the low temperature shift catalyst is kept down to a level that avoids damage to the catalyst, preferably in the range 0.1 to 0.3 when the pressure is over 40 bar abs. This means that the steam to carbon ratio in steps (a) and (b) should not be too high, but it can be readily attained using ratios in the range 2.5 to 3.5 (methane feedstock) or 2.4 to 3.2 (feedstock of empirical formula $CH_2$) or in intermediate ranges of hydrocarbons of intermediate composition. The higher nitrogen content due to excess air helps to keep down the steam to dry gas ratio. If it is desired to use a higher steam to carbon ratio in steps (a) and (b), or to add extra steam in or after step (b), the steam to dry gas ratio can be kept down by recycling synthesis gas from a downstream point after removal of steam and carbon dioxide and possibly after compression.

Other shift conversion systems such as iron chrome/-$CO_2$ removal/iron chrome or systems based on catalysts containing other Group VI and Group VIII metals and oxides or on alkali metal compounds of weak acids could be used if desired.

Step (d), removal of carbon oxides, is usually carried out in a first stage in which carbon dioxide is substantially removed, and a second in which residual carbon monoxide and carbon dioxide are removed down to a very low level such that the ammonia synthesis catalyst is not significantly poisoned by them. If desired, any carbon monoxide remaining after shift step (c) can be selectively oxidised to carbon dioxide.

The first step of step (d) can be carried out using any liquid absorbent. Well-established chemical systems such as Benfield's potassium carbonate or diethanolamine-potassium carbon, "Vetrocoke", "Catacarb" or amine systems such as monoethanolamine can be used. These have, however, the disadvantage of consuming a substantial quantity of steam in the regeneration of the liquid absorbent, a requirement that is especially inconvenient when the steam to dry gas ratio of the shifted gas is at the preferred low levels. A 2-stage carbon dioxide removal, in the first stage of which most of the carbon dioxide is absorbed in an amine, such as triethanolamine, that is regenerable substantially without heating, and in the second stage of which an absorbent is used that does require heat in regeneration, is therefore preferable. The preferred high pressure in step (a), which is substantially maintained apart from inevitable pressure drops in subsequent steps, makes possible the use of "physical" absorbents, the preferred examples of which can be regenerated merely by lowering pressure. Suitable absorbents used in industrially developed processes are tetramethylene sulfone ("Sulfinol") propylene carbonate (Fluor), N-methyl-2-pyrrolidone ("Purisol"), methanol ("Rectisol") and the dimethyl ether of polyethyleneglycol ("Selexol").

If desired, part or all the carbon dioxide can be removed by absorption in anhydrous or aqueous ammonia. Such a procedure is especially useful if the ammonia to be produced by the process of the invention is to be used for urea synthesis or for making ammonium sulphate by the calcium sulphate process. In a convenient form of the process, applicable especially when it is desired to operate steps (a) to (d) at pressures less than optimal for using physical absorbents, the bulk of the carbon dioxide can be removed in a physical absorbent and the remainder in a chemical solvent as mentioned above or in ammonia. The latter procedure can be designed to suit any desired relative outputs of ammonia, carbon dioxide and urea.

The second stage of step (d) can be carried out by contacting the gas with a carbon oxides absorbent such as copper liquor but is most conveniently effected by catalytic methanation, for example over a supported nickel catalyst at an outlet temperature in the range 250°–400° C. This decreases the carbon oxides content to a few parts per million by volume but produces water, which can be removed by cooling, separation and passage over a water-absorbent such as alumina or a molecular sieve.

The dried gas from step (d) contains nitrogen, hydrogen in less than the stoichiometric ratio from ammonia synthesis, a small quantity (usually under 1% v/v) of methane and fractional percentages of noble gases introduced with the secondary reformer air, and is thus ready for use as an ammonia synthesis gas. It may be compressed to any convenient synthesis pressure, for example in the range 120–400 bar abs. Owing, however, to its unusually high pressure, it is preferably passed to the synthesis with less than 50% compression and preferably, no more than the increase in pressure (for example up to 20%) encountered in a circulator in a recycle-type synthesis. Such a small increase uses much less energy than process in common use and is one of the main factors by which the energy consumption in the process according to the invention can be unprecedentedly low. If desired, the pressure increase can be rather larger without seriously impairing the energy economy of the process, preferably such as can be provided by a single machine acting as compressor and circulator and typically up to 100 bar and more conveniently in the range 20-80 bar. Preferably the compressor-circulator is a single-barrel machine. The compressor and circulator functions can be separated within the machine so as, for example to provide for mixing of recycle gas with fresh synthesis gas outside the barrel. As an alternative such mixing can be effected within an undivided barrel.

The larger pressure increase is advantageous in the process described below employing cryogenic separation of a hydrogen-rich stream from reacted synthesis gas because it permits the use of gas expansion to provide part of the cooling. In particular a side stream of synthesis gas is taken downstream of the compressor section of the machine or of the circulator section and passed through a hydrogen separation unit, whereafter the hydrogen rich fraction is returned to the process as the inlet of the compressor or to an intermediate level therein, depending on the extent to which its pressure has been decreased in the separation unit.

The "fresh" synthesis gas from step (d) can be fed through a succession of catalytic stages and ammonia removal stages but, as in most ammonia synthesis processes is preferably mixed with synthesis gas recycled from an ammonia removal stage. At the preferred synthesis pressures the attainable pass conversion over the synthesis catalyst is relatively low, giving an ammonia outlet concentration in the range 8 to 12% v/v. The ratio of recycled gas to fresh gas is suitably in the range 4 to 6.

The catalyst used in the ammonia synthesis can be of the usual composition, namely iron with promoting quantities of non-reducible oxides such as those of potassium, calcium, aluminium and others such as of beryllium, cerium or silicon. In order to afford maximum activity and thus to compensate for the lower rate of reaction due to low pressure, the iron catalyst preferably contains also cobalt, suitably to the extent of 1-20% w/w calculated as $Co_3O_4$ on the total oxidic composition from which the catalyst is made by reduction and in which the iron oxide is assumed to be all $Fe_3O_4$. The catalyst can be in the form of particles in the sieve range 18 to 4 ASTM (1-4.7 mm) especially 10 to 5 (2-4), if it is desired to maximise their available contact surface or larger, for example up to 20 mm; the arrangement of the catalyst in the synthesis reactor preferably therefore may afford short gas flow paths, such as radial or secantial flow in a cylindrical reactor. The outlet temperature of the synthesis catalyst is preferably in the range up to 500° C., especially 300°-450° C. for example 350°-430° C. This is lower than has been usual, in order to obtain a more favourable synthesis equilibrium. The catalyst volume is suitably in the range 100-200 $m^3$ per 1000 metric tons per day output; this is higher than has been usual but can be tolerated because at the low operating temperature and pressure the reactor can be of simple construction for example of the hot-wall type.

The recovery of ammonia from reacted synthesis gas can be carried out by ordinary air-cooling or water-cooling if the pressure is high enough, but at preferred pressures in the range 40-80 bar abs. is best carried out by absorption in water. Absorption in an acid or on a solid such as zinc chloride can be used if convenient. Absorption in water is conveniently carried out in two or more stages, in the first of which the gas contacts a relatively strong ammonia solution (for example 15 to 30% w/w) and in the last pure water or a weak ammonia solution (for example up to 10% w/w). The water temperatures and flow rates are preferably such that the gas leaving the absorption contains less than 2.0% v/v of ammonia: this has the effect of increasing the pass conversion over the catalyst and thus compensating for the lower pressure. After the absorption the gas is dried in order to prevent deactivation of the catalyst by water. The aqueous ammonia product can be used as such or distilled to recover anhydrous ammonia from it.

Since the fresh synthesis gas contains nitrogen in excess of the stoichiometric proportion, noble gases and also methane to an extent dependent on the incompleteness of the secondary reforming reaction and of the shift reaction, the continued removal of ammonia from it, especially in a recycle process, results in a substantial concentration of non-reacting gases. It is preferred to treat the gas mixture to remove such gases before their concentration reaches 10% v/v especially 5.0% v/v. This treatment could be applied to the whole of the reacted gas after removal of ammonia or even to the mixture of reacted gas and fresh synthesis gas, but it is preferred to apply it only to a side stream, because then any failure of the treatment plant does not cause a shut-down of the whole production process. The side stream can conveniently be taken from the gas downstream of the ammonia separation and treated for hydrogen separation, whereafter the hydrogen is returned to the circulating synthesis gas. It could be taken before ammonia separation but the treatment would then involve also ammonia recovery. The hydrogen separation treatment involves a pressure-drop and may involve also a pressure let-down through an expansion engine in order to decrease the gas temperature for cryogen separation; consequently the hydrogen stream has to be compressed to return it. Preferably therefore in a recycle synthesis loop the side stream is taken from the effluent of the circulator, where the gas pressure in the system is highest, and the separated hydrogen stream is returned to the inlet of the circulator, where the gas pressure is lowest. Part or all of the separated hydrogen stream can be recycled to the low temperature shift inlet.

The hydrogen separation treatment can be by any suitable means, for example by cryogenic fractionation, molecular sieve adsorption of gases other than hydrogen or palladium membrane diffusion. The hydrogen stream returned to the synthesis can be substantially (over 90% v/v) pure but in any event should contain at least 3 molecules of hydrogen per nitrogen molecule. The non-reactive gases discarded from the hydrogen separation treatment should of course be substantially free of hydrogen, since any discarded hydrogen represents wasted energy. If the side stream contains methane, the separation treatment can be designed and operated to separate a methane-rich stream and that stream can be used as process feed or furnace fuel for step (a) or fed to step (b). A typical side stream flow rate is in the range 15 to 30% of total gas flow.

A preferred cryogenic purification of the hydrogen stream in step (ii) comprises the stages:
  (a) subjecting it in a first indirect cooling stage to heat exchange with one or more cool streams to be described;
  (b) cooling the product of stage (a) by expansion in an engine;
  (c) subjecting the engine effluent in a second indirect cooling stage to heat exchange with one or more cold streams to be described, whereby to decrease its temperature to below the dewpoint of nitrogen;

(d) separating a liquid phase containing nitrogen, methane and possibly noble elements;

(e) passing the hydrogen-enriched gaseous phse from step (d) into heat exchange in stage (c) as one of the cold streams, (f) passing the hydrogen-depleted liquid phase from stage (d) into heat exchange in stage (c) as one of the said cold streams;

(g) passing the streams thus warmed in stages (e) and (f) into heat exchange in stage (a) as the said cool streams;

(h) passing the hydrogen-enriched gaseous phase back to the synthesis loop.

Usually the hydrogen-depleted phase will evaporate in stage (f) and possibly in part in stage (g). It is then discarded possibly by discharge to atmosphere but possibly to a use for example as an auxiliary cooland or as a working fluid in a heat engine or as a fuel, depending on its composition and on local requirements. If its methane content is high enough it may be used for synthesis gas generation.

The gas entering stage (a) is suitably at a temperature in the range 0°–50° C., typical of gas leaving an ammonia separation system or leaving a circulator.

In the ammonia production process heating and cooling operations are integrated so as to avoid or minimise importation or waste of energy. The principal heat recoveries are as follows, in a typical process:

| Source | Temp °C. | Recipient of heat |
|---|---|---|
| Furnace flue gas | 920 | Step (a) reactants preheater |
| | | Boiler and boiler feed water heater |
| | | Heaters for natural gas and process air |
| | | Furnace combustion air preheater |
| Step (b) effluent | 1000 | Boilers raising steam at 100-200 bar |
| | | Steam superheaters or reheaters |
| HT shift effluent | 460 | Boiler raising steam at 100-200 bar |
| | 330 | Boiler feed water heater |
| LT shift effluent | 250 | Boiler feed water heater |
| | 170 | Various low grade uses |
| Synthesis effluent | 460 | Boiler feed water heater |
| Process air compressor | — | Process air (compressor with limited or no interstage cooling used) |

The steam raised at 100–200 bar is let down in one or more pass-out turbines exhausting at a pressure suitably of 45–90 bar and the exhaust is partly used as feed to step (a), partly let down in one or more further turbines exhausting at low pressure or to condenser. The turbines drive the process air compressor, the circulator and (preferably by way of electrical generators) the smaller machines such as liquid pumps, furnace combustion air pump and flue gas fan. As a result of the relatively high methane content of the gas leaving step (a) and the substantially complete utilisation of hydrogen, the waste heat recoverable from furnace flue gas is less per metric ton of ammonia per day than in processes in common use but at the same time, in the absence of a compression stage, less energy is to be found from waste heat. Consequently the process represents a new balance of energetic provision and use. The plant combination is also novel.

Figure 2:
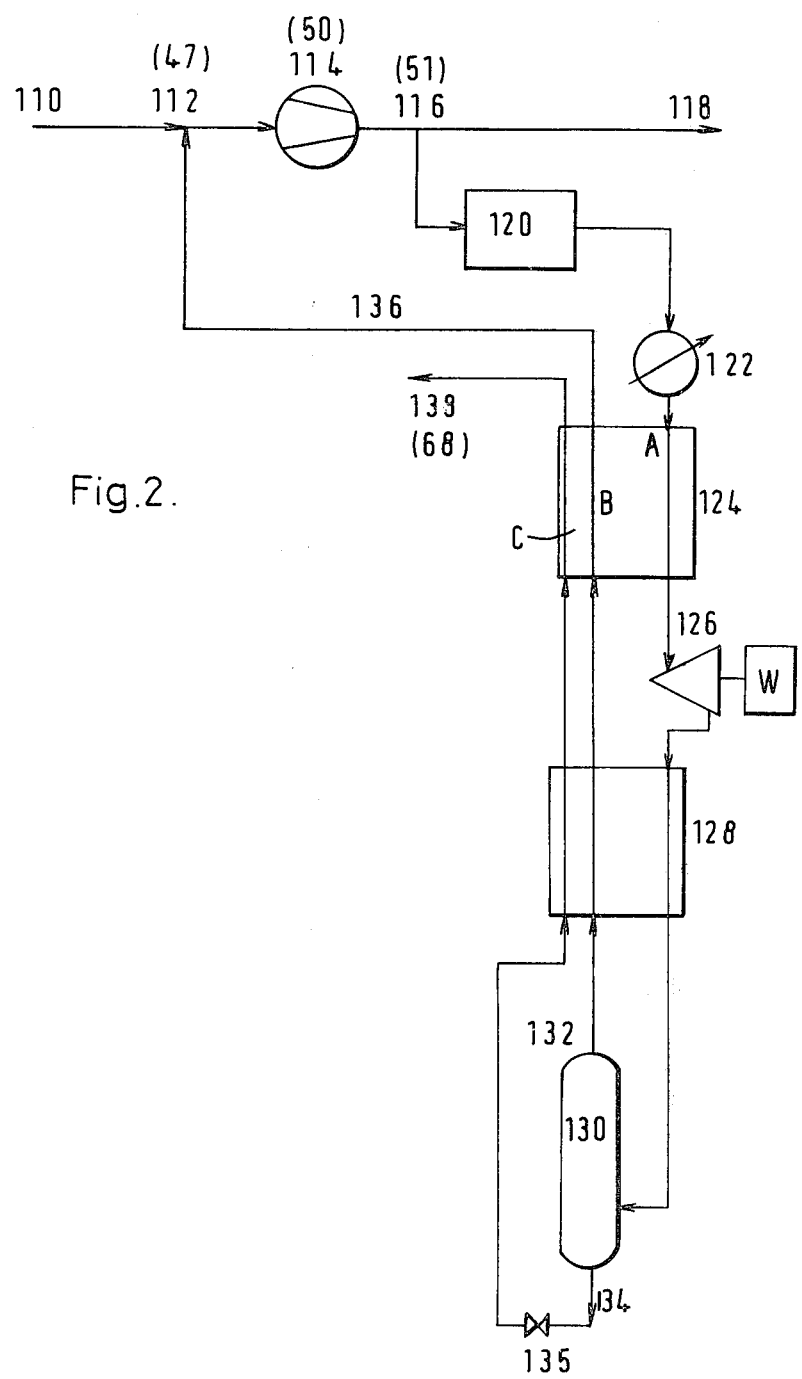

The invention is illustrated by the accompanying drawings in which:

FIG. 1 shows a flowsheet of the ammonia production process in two preferred forms, distinguished according as they follow full-line path A or dotted path B; and FIG. 2 shows a flowsheet of the cryogenic separation system corresponding to item 66 in FIG. 1; items occurring also in FIG. 1 are shown with both numbers.

In FIG. 1 a heated mixture of natural gas and steam is fed at 10 into the catalyst filled primary reforming tubes heated in furnace 14. The resulting hot gas, consisting of carbon oxides, hydrogen, methane and excess steam is fed to secondary reformer 16 and heated air at 18 is fed into that gas by means of a suitable nozzle. A flame is formed in the space at the top of reformer 16 but the temperature falls as the methane-steam reaction comes to equilibrium over the catalyst. The resulting gas has a very low methane content as a result of the relatively high air feed rate into 16 and also contains nitrogen in excess of what will react with the hydrogen that will be present after the subsequent stages. The gas leaving 16 is cooled at 20, by passage through a high pressure boiler, a boiler feed water heater and possibly other heat exchanges such as with natural gas and process air, to the inlet temperature of high temperature shift catalyst 22. The shifted gas is cooled at 24, which like 20 also includes a high pressure boiler and other heat exchanges, to the inlet temperature of low temperature shift catalyst 26. Shifted gas from 26 is cooled at 28, which represents low grade heat recoveries such as boiler feed water heating and possibly carbon dioxide absorbent regeneration and includes cooling to below the dewpoint of steam such that water is separated from the gas in separator 30. The resulting relatively dry gas is contacted in packed tower 32 with a carbon dioxide absorbent solution fed in at 34. Carbon dioxide-loaded solution is taken off at 36 and passed to a regeneration tower (not shown) and returned to point 34. Gas substantially free of carbon dioxide leaves the top of tower 32, is heated in feed/effluent heat exchanger 38 and enters methanator 40 in which residual carbon monoxide and carbon dioxide are converted to methane. Methanated gas is cooled by heat exchange with feed gas at 38 and united at mixing point 44 with a steam of recycled synthesis gas to be described. The mixed gas is cooled further at 42 and passed to separator 46, in which the bulk of its water content is removed, optional mixing point 47 (see path B below), where a recycle hydrogen stream is fed in, and drier 48 in which it is dehydrated to the low level of water required in the synthesis. Dehydrated gas is passed into circulator 50 in which its pressure is increased sufficiently to maintain circulation, united at 52 with a recycle hydrogen stream to be described, heated to catalyst inlet temperature in feed/effluent heat exchanger 54 and passed into ammonia synthesis reactor 56. (For simplicity, reactor 56 is shown with a single catalyst bed and gas feed point, with an external feed/effluent heat exchanger, without internal cooling and without external heat recoveries. In practice a more complicated reactor would be used). In 56 incomplete conversion to ammonia occurs. The reacted gas is cooled by stages to a temperature at which ammonia can be separated from it. The cooling stages include feed/effluent heat exchange at 54 and possibly other heat exchanges such as steam raising and boiler feed water heating, ending with final cooling with discard of heat represented generally by 58. Ammonia is recovered as a liquid in separator 60, which can be of the simple type with baffle plates if the gas pressure is high enough and cooling at 58 is to below the dewpoint of ammonia; alternatively and more conveniently separator 60 is a packed absorber down which water is fed countercurrently to the ammonia-containing gas. At 62 anhydrous ammonia is run off to store or aqueous ammonia is run off to a distillation system producing anhydrous ammonia overhead and water, possibly also a relatively strong ammonia solution, as bottoms, for recycle to the absorber. Reacted gas leaving the top of separator 60 is then fed to point 44 and united with methanated gas. The purge gas stream taken at 64 is explained below.

FIG. 1 shows two methods for treating reacted synthesis gas for recovery of hydrogen.

Path A (full lines)

Following path A a purge stream (25% v/v of total flow), is diverted at 64 and fed to hydrogen recovery unit 66. Unit 66 typically includes a drier and a cryogenic fractionation plant in which the gas is cooled to minus 188° C. to condense out nitrogen, methane and noble gases. The uncondensed fraction, consisting of substantially pure hydrogen is fed via blower 70 to point 52 where it is united with synthesis gas about to be heated and fed to synthesis reactor 56. The condensed fraction is re-evaporated in order to cool pure gas entering unit 66 and leaves at 68. If it contains sufficient methane it can be used as fuel in furnace 14. Alternatively it can be fractionated during evaporation in order to produce a methane stream to be used as furnace fuel or as process feed at 10.

Following path B a side stream (25% of total flow) of mixed gas is taken at 51 at the outlet of circulator 50 and passed into hydrogen recovery unit 66. The hydrogen fraction from 66 is fed to point 47 upstream of drier 48. Path B has the advantage that the pressure difference across circulator 50 is utilised to drive the gas through unit 66, so that no blower 70 is needed. By feeding the hydrogen stream at 47 the temperature of the gas entering the drier can be kept cooler and consequently drier 48 will have greater capacity. The path B process is especially suitable when circulator 50 includes a compression stage: then the hydrogen stream is fed to the inlet of that stage instead of at 47.

It is to be understood that steam raised at points 20 and 24 and possibly also by heat exchange with flue gases from furnace 14 is let down in a turbine driving circulator 50 and is used to drive (conveniently by way of an alternator and electric motors) the numerous other machines such as blower 70, the compressor for process air fed at 18, the blower supplying combustion air to the burners of furnace 14, and liquid feed pumps.

In FIG. 2, which represents one preferred form of the stages within item 66 of FIG. 1, line 110 carries a mixture of make-up fresh ammonia synthesis gas and unreacted gas from an ammonia separator or absorber. The gas after treatment in the process of the invention will pass out at 118 to a final drier and then via the usual heat exchangers to the ammonia synthesis catalyst. At point 112 there enters a side stream of hydrogen-enriched gas made by the process of the invention. The mixed stream is compressed at 114 to at least the extent required to maintain circulation. At 116 a side stream is taken off and may be washed with absorber feed water to removal residual ammonia from it. It is passed through drier 120 charged with solid drying agent such as a molecular sieve. This stream is chilled at 122 by indirect heat exchange with circulated refrigerant, passed through first cold box 124 and then let down in pressure in engine 126 with performance of work W. It is to be noted that chiller 122 can be omitted if the pressure increase at 114 is relatively large. Also drier 120 can be omitted if cold box 124 is operated with switching gas paths. Thus it is operated at first as shown, with untreated gas following path A, until sufficient condensation of water and ammonia or of ammonia only if the gas has previously been dried, has taken place on the walls of pipe A to increase its pressure drop measurably. Then paths A and C are interchanged so that untreated gas passes through a clean pipe and the dry gas carries away the condensed water and ammonia. Alternatively, especially when previously dried gas is used, paths A and B are interchanged, so that the condensed ammonia is carried back into stream 10.

Gas cooled by expansion in engine 126 is then passed through cold box 128 to below the dewpoint of at least one of its components and thence into separator 130. Uncondensed gas enriched in hydrogen passes overhead at 132 and constitutes one of the cold streams entering cold box 128. Bottoms liquid passing out at 134 is let down in pressure through valve 135 and passes into cold box 128, where it is allowed to evaporate, constituting the other cold stream. The resulting two gas streams having been warmed in cold box 128 constitute the cool streams heat exchanged with untreated gas in cold box 124 before cooling by expansion in engine 126. The hydrogen-enriched gas warmed further in cold box 124 is passed back to the synthesis stream at 112, at the low pressure side of compressor/circulator 114. The hydrogen-depleted stream is passed out at 138.

EXAMPLE

Table 1 shows the gas pressure, temperature, flow rate and composition at the significant positions in a process according to FIG. 1 for the manufacture of 1000 metric tons per day of ammonia (as $NH_3$). The $H_2:N_2$ ratio of the methanated gas is 2.34, as a result of the rate of feed or air to the secondary reformer, which rate is about 28% greater than in a process producing a gas with an $H_2:N_2$ ratio of 3.0. As a result it is possible to operate the primary reformer to produce a gas containing 17.2% v/v of methane on a dry basis, that is, to operate at the unusually high pressure of 45.2 bar abs. at the steam ratio of 3.0 (which is no higher than usual) and to keep the temperature down to 792° C. at the outlet. The temperature of the natural gas/steam mixture entering the primary reformer is 640° C., which is higher than usual and is attained at the cost of more expensive alloy used in the construction of the required preheater, but usefully increases the conversion of methane in the primary reformer. The unusually low $H_2:N_2$ ratio has the effect that hydrogen is more completely reacted (other things being equal) in the synthesis reactor. The recycle rate and purge rate are both higher than usual, but the high purge rate does not result in loss of hydrogen because hydrogen is recovered from it and returned to the synthesis. The catalyst volume is 200 m³ using a promoted iron catalyst or 120 m³ using a promoted iron-cobalt catalyst, as explained further below.

About 98% of the hydrogen is used in ammonia synthesis. Allowing for energy used in evaporating gaseous ammonia from aqueous solution and reliquefying it, the process consumes 300 or in most favourable conditions 285 therms per metric ton of ammonia.

low as 50% at the lower temperature at which the cobalt-containing catalyst is active.

TABLE 1

Pressure, temperature, composition and flow rate of process streams in FIG. 1

| Position | p bar abs | Temp °C. | CO | CO$_2$ | H$_2$ | CH$_4$ | N$_2$ | Ar | H$_2$O | NH$_3$ |
|---|---|---|---|---|---|---|---|---|---|---|
| 10 inlet | 49.2 | 640 | — | 1.29 | — | 1202.33 142.36* | 31.06 | — | 4037.41 | — |
| 10 outlet | 45.2 | 792 | 301.06 | 394.84 | 2394.52 | 650.08 | 31.06 | — | 2949.25 | — |
| 16 outlet | 44.7 | 1000 | 846.18 | 463.46 | 3375.16 | 36.35 | 1756.68 | 22.12 | 3196.07 | — |
| 22 outlet | 44.2 | 431 | 215.05 | 1094.59 | 4006.29 | 36.35 | 1756.68 | 22.12 | 2564.95 | — |
| 32 inlet | 43.2 | 75 | 21.63 | 1288.01 | 4199.71 | 36.35 | 1756.68 | 22.12 | 65.05 | — |
| 38 outlet | 42.7 | 35 | (1 ppm v/v) | (2 ppm v/v) | 4110.66 | 64.02 | 1756.68 | 22.12 | 87.37 | — |
| 56 inlet | 47.0 | 350 | — | — | 70.98 | 4.13 | 23.66 | 1.22 | 1 ppm | 0.01 |
| 56 outlet | 46.5 | 400 | — | — | 63.10 | 4.54 | 21.04 | 1.35 | 1 ppm | 9.97 |
| 60 outlet | 44.0 | 35 | — | — | 69.99 | 5.03 | 23.33 | 1.5 | 0.13 | 0.02 |
| 70 inlet 47 recycle | 43 | 30 | — | — | 91.3 | 9.2 | 7.8 | 0.7 | — | — |

*This flow rate is of higher gaseous hydrocarbons in the natural gas and is expressed in te-mol h$^{-1}$ of carbon C.

This is to be compared with 345 to 380 therms in plants in commen use. Furthermore the process according to the invention can be completely self-sufficient in all types of energy.

The effect of the cryogenic separation can be seen by comparing the gas compositions at positions 60 outlet and 70 inlet. In an alternative process as shown in FIG. 2 the side stream taken at 116 is 20% v/v of the effluent from 114 and has the % v/v composition 71.2 H$_2$, 23.7 N$_2$, 3.9 CH$_4$, 1.2 Ar. The hydrogen-enriched stream returned at 112 then has the % v/v composition 85.6 H$_2$, 13.6 N$_2$, 0.4 CH$_4$, 0.4 Ar. The pressure at the inlet of circulator 114 is 46 bar and the outlet 51 bar in this typical process.

Activity of the Ammonia Synthesis Catalyst

The ammonia synthesis data in the table are based on activity measurements on a catalyst made by reducing the following oxide composition, weight percent, as made by co-fusion and solidification.

| | |
|---|---|
| Fe$_3$O$_4$ | balance |
| CoO | 5.2 |
| CaO | 1.9 |
| K$_2$O | 0.8 |
| Al$_2$O$_3$ | 2.5 |
| MgO | 0.2 |
| SiO$_2$ | 0.5 |

This catalyst was compared with the corresponding cobalt-free catalyst by passing over them in parallel reactors a stoichiometric ammonia synthesis gas and adjusting the gas space velocity to produce an outlet gas containing the same volume percentage of ammonia. The activity of the cobalt-containing catalyst relative to that of the cobalt-free catalyst taken as 100 at various ammonia synthesis temperatures was:

| | |
|---|---|
| 450° C. | 134 |
| 400° C. | 144 |
| 350° C. | 160 |

It was shown in further experiments that during ammonia synthesis the cobalt-containing catalyst maintains its activity approximately as well as the cobalt-free catalyst. Thus the volume of the cobalt-containing catalyst required for a given ammonia output is typically under 75% that of a corresponding cobalt-free catalyst and as

What is claimed is:

1. An ammonia production process which comprises
   (a) primary catalytically reforming at superatmospheric pressure a hydrocarbon feedstock with steam to give a gas containing carbon oxides, hydrogen and methane;
   (b) secondary catalytically reforming the gas from step (a) by introducing air and bringing the mixture towards equilibrium, whereby to produce a gas containing nitrogen, carbon oxides, hydrogen and a decreased quantity of methane;
   (c) converting carbon monoxide catalytically with steam to carbon dioxide and hydrogen;
   (d) removing carbon oxides to give a nitrogen-hydrogen ammonia synthesis gas and compressing said gas to ammonia synthesis pressure;
   (e) reacting the synthesis gas to produce ammonia and recovering ammonia from the reacted gas; and
   (f) discarding non-reactive gases present in the synthesis gas;
   and is characterized by:
   (i) operating step (a) at a pressure of 40-80 bar absolute and in conditions of steam-to-carbon ratio and temperature to produce a gas containing at least 10% v/v methane and using in step (b) a quantity of air in excess of what would introduce 1 molecule of nitrogen per 3 molecules of hydrogen;
   (ii) in step (d) compressing said ammonia synthesis gas including excess nitrogen resulting from said use of excess air in step (i) by no more than 100 bar; and
   (iii) treating a side stream of synthesis gas after reaction to synthesise ammonia to separate a stream enriched in hydrogen and returning the enriched stream to the synthesis.

2. A process according to claim 1 in which in steps (b) and (i) the outlet temperature is in the range 950°-1050° C., the outlet methane content is in the range 0.2 to 10% v/v on a dry basis.

3. A process according to claim 2 in which the methane content is about 0.5% v/v on a dry basis.

4. A process according to claim 1 in which in step (a) the steam to carbon ratio is in the range 2.5-3.5, and the outlet temperature is in the range 750°-850° C.

5. A process according to claim 1 in which the pressure in step (a) and subsequent steps is at least 40 barabs and step (c) includes a low temperature shift stage at a steam to dry gas molar ratio in the range 0.1 to 0.3.

6. A process according to claim 1 in which step (d) includes a first stage in which carbon dioxide is substantially removed, said stage comprising contacting the gas with triethanolamine whereby to remove most of the carbon dioxide, regenerating said triethanolamine without heating, contacting the resulting carbon dioxide depleted gas with a liquid absorbent selected from monoethanolamine or aqueous potassium carbonate and regenerating said liquid absorbent by heating.

7. A process according to claim 1 in which in step (e) the ammonia synthesis catalyst contains iron, promoting compounds and cobalt, the cobalt content being 1–20% w/w calculated as $Co_3O_4$ on the total oxidic composition from which the catalyst is made and in which the iron oxide is assumed to be all $Fe_3O_4$, and the synthesis catalyst outlet temperature is in the range 350°–430° C.

8. A process according to claim 1 in which in step (e) ammonia is recovered from reacted synthesis gas by absorption in water.

9. A process according to claim 1 in which step (e) is carried out by pumping the synthesis gas in a loop comprising the synthesis catalyst, an ammonia separator and a circulator and in steps (f) and (iii) a side stream of synthesis gas after reaction to synthesis ammonia and after recovery of ammonia therefrom is withdrawn from the gas leaving the circulator and treated to separate a gas enriched in hydrogen and the hydrogen-enriched gas is returned to the inlet of the circulator.

10. A process according to claim 1 in which in steps (f) and (iii) a side stream of gas is treated by:

(a) subjecting it in a first indirect cooling stage to heat exchange with one or more cool gas streams derived via a heat exchange from separation of a liquid phase containing nitrogen and methane and possibly noble elements;

(b) cooling the effluent of stage (a) by expansion in an engine;

(c) subjecting the engine effluent in a second indirect cooling stage to heat exchange with one or more cold streams derived from separation of a liquid phase containing nitrogen and methane and possibly noble elements, whereby to decrease its temperature to below the dewpoint of nitrogen;

(d) separating a liquid phase containing nitrogen, methane and possibly noble elements;

(e) passing the hydrogen-enriched gaseous phase from stage (d) into heat exchange in stage (c) as one of the cold streams;

(f) passing the hydrogen-depleted liquid phase from stage (d) into heat exchange in stage (c) as one of the said cold streams;

(g) passing the streams thus warmed in stages (e) and (f) into heat exchange in stage (a) as the said cool streams;

(h) passing the hydrogen-enriched gaseous phase back to the synthesis loop.

11. A process according to claim 1 in which the side stream in step (iii) is 15 to 30% by volume of the total gas flow.

12. A process as in claim 1 wherein step (a) is operated at 750°–850° C. and wherein the compression in step (f) (ii) is less than 50%.

* * * * *